June 7, 1966 F. B. KARLQUIST 3,254,599
FLEXOGRAPHIC PRINTING
Filed Feb. 19, 1962 2 Sheets-Sheet 2

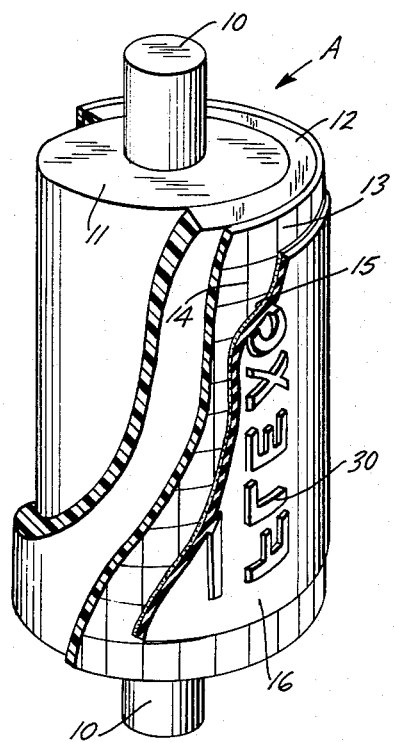
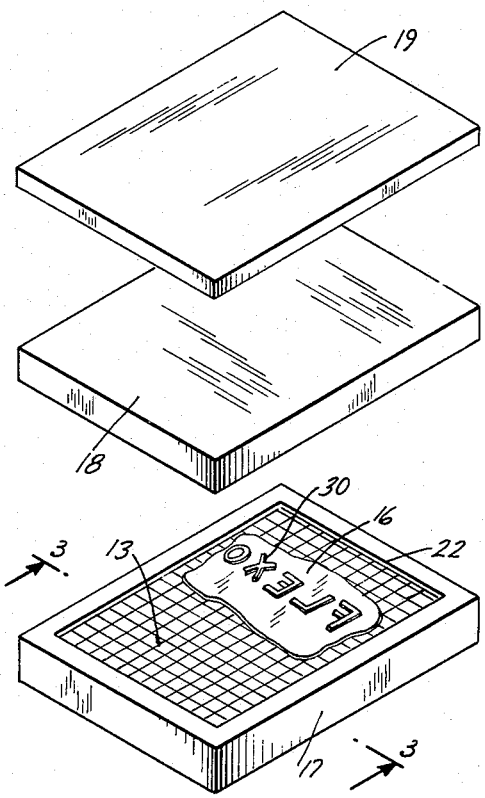
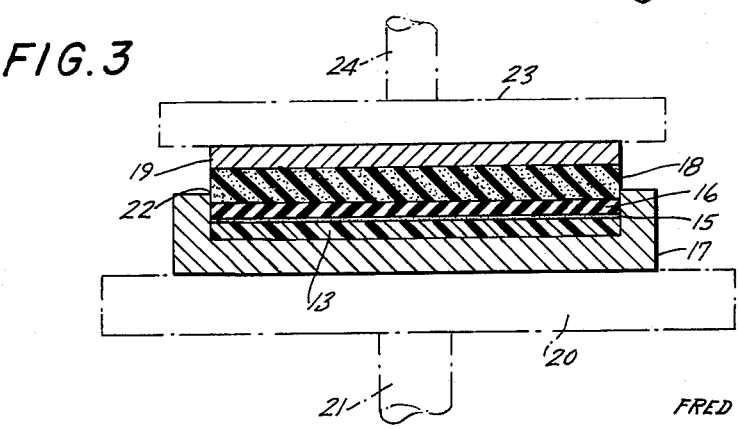

INVENTOR.
FRED B. KARLQUIST
BY
ATTORNEY

United States Patent Office 3,254,599
Patented June 7, 1966

3,254,599
FLEXOGRAPHIC PRINTING
Fred B. Karlquist, Peekskill, N.Y., assignor to Parmarco, Inc., Roselle, N.J., a corporation of Maryland
Filed Feb. 19, 1962, Ser. No. 174,093
4 Claims. (Cl. 101—376)

The present invention relates to flexographic printing, and it particularly relates to a flexograph make ready method and instrument.

In flexograph processes and particularly in making a flexographic printing process and also in aniline printing processes, considerable difficulty has been experienced in providing proper concentricity and surface evenness in connection with rubber or synthetic plates mounted on cylinders used in the printing procedure.

Further difficulties are experienced in obtaining proper register, line-up and support of the plates to be mounted in connection with cylinders to give assurance of correct alignment and register.

It is among the objects of the present invention to provide a novel flexograph make ready method and instrument having mechanical means for providing concentricity and surface evenness and which will give assurance of improved flexographic methods.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In the preferred form of the present invention, there is provided a square ruled plastic base sheet desirably produced from nylon or even from polyethylene terephthalate, such as Mylar or other polyester film material for the purpose of registering line-up and support of the plates to be mounted.

These plates are first positioned on the ruled plastic base sheet and then this composition plate and ruled plastic base sheet is mounted on a cylinder.

In the preferred form of the invention, there also may be provided a secondary layer of material to function as a carrier and leveling media for the printing plates.

The secondary layer may be an epoxy plastic material or some other suitable material.

In the preferred form of the invention, the printing cylinder is provided with a base roller upon which is placed the secondary layer consisting of a plastic material.

On top of the secondary layer, there is positioned a plastic base sheet of nylon or polyester film provided with register lines.

On this plastic sheet is carried the adhesive layer for the rubber or plastic plates.

In preparing the plate, there is provided a chase which received the plate mount or plastic film on which the plates are positioned, a rubber cushion, and on top, a steel plate for compression purposes.

In this chase and through the steel plate, mechanical or hydraulic pressure is applied after the rubber plates have been registered upon the nylon sheet, and the registering plastic sheets have been placed in proper position.

In the next operation, a sleeve is provided which is mounted on a bottom plate with a journal or cylinder being positioned therewithin, and the prepared sheet is inserted in the sleeve with the plates facing the inside of the sleeve.

Then the plastic casting compound is poured in the space between the base of the printing cylinder, and the plate with application of a compression means which will force the casting compound into position.

This will result in giving a full alignment and concentricity.

The preferred casting compound is an epoxy resin having a predetermined curing time in the range of one to ten hours, and this epoxy resin may have suitable property to assure that it will cure within the predetermined time period.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a side perspective view of the final printing roll after it has been formed partly broken away to show the various layers of material which form the construction thereof.

FIG. 2 is a separated perspective view showing the manner in which the plate is formed illustrating the chase, the rubber cushion and the steel plate.

FIG. 3 is a transverse sectional view upon the line 3—3 of FIG. 2 showing the various elements assembled together and pressed to form the necessary sandwich to be applied to the roller.

Figure 4:
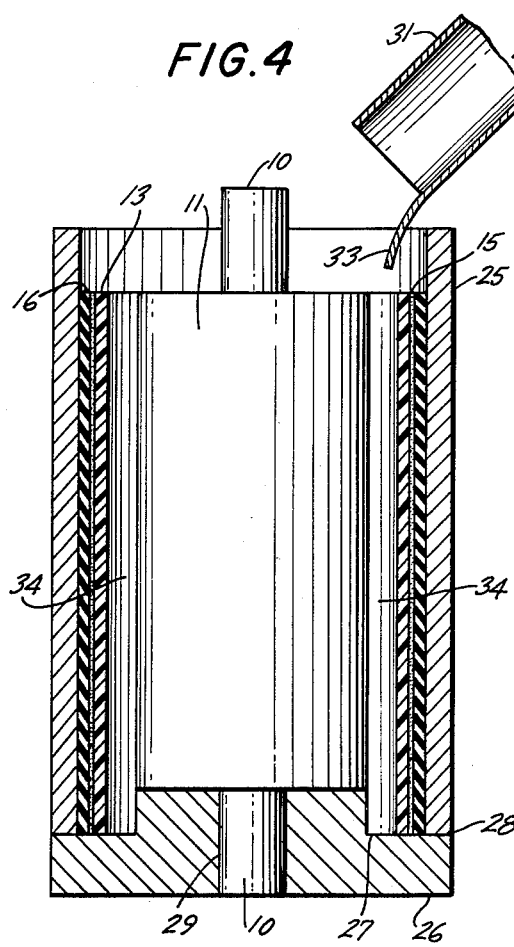
FIG. 4 is a transverse sectional view illustrating an intermediate stage in the assembly of the printing roller before the epoxy resin is applied.
Figure 5:
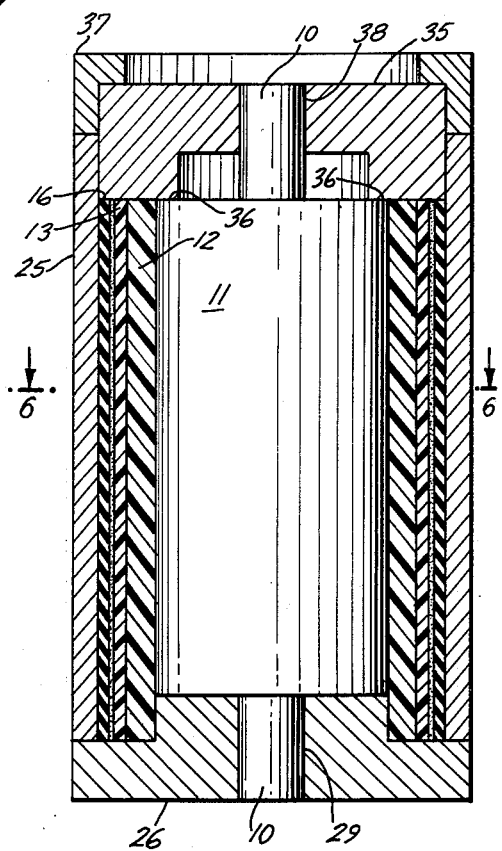
FIG. 5 is a transverse sectional view similar to FIG. 4 showing the assembly after the epoxy resin has been applied.
Figure 6:
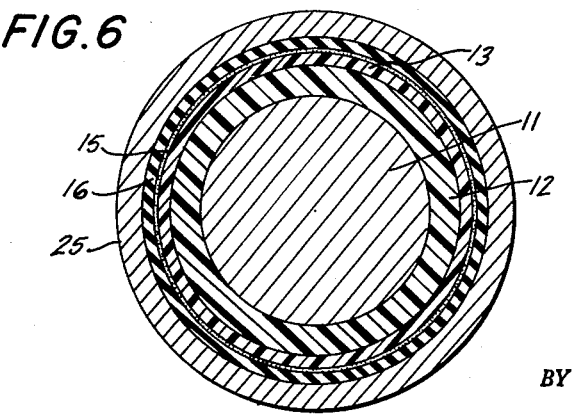
FIG. 6 is a transverse sectional view upon the line 6—6 of FIG. 5.

Referring to FIG. 1, there is shown a flexographic printing cylinder A.

This cylinder has a central journal or shaft 10, a cylindrical base 11, a cast epoxy resin 12, a plastic sheet 13 of nylon or polyester resin with register lines 14, an adhesive layer 15, and the rubber or plastic printing plates 16.

The present invention is particularly directed to this rubber plate roller as indicated in FIG. 1 as well as the method in which it is made as in FIGS. 2 to 6.

In FIG. 2 in separated form is shown the chase 17 in which is placed the plastic sheet 13 having the graduations thereon and then the rubber or other synthetic plates 16 is positioned thereon with intervening adhesive.

Positioned above the chase 17 is the rubber cushion 18, and the steel pressure plate 19 (see FIG. 2).

In FIG. 3 is shown the manner of assembly which is diagrammatically indicated in the separated view of FIG. 2.

The chase 17 is placed upon the lower platen 20.

The shaft 21 can apply mechanical or hydraulic pressure.

In the recess 22 of the chase 17 is positioned the printing plate 16 which is attached by means of adhesive 15 to the graduated register plastic sheet 13.

The rubber member 18 is then pressed downwardly by the steel plate 19 which is acted upon by the upper platen 23 to which hydraulic or mechanical pressure is applied by means of the shaft 24.

This pressure will form a sandwich 13–15–16 which is then adopted for then being placed upon the printing roller.

After the sandwich 13–15–16 is formed, it is then placed inside of the cylinder 25 in FIG. 4.

The cylinder receives the base cylinder 11, and the shaft or journal 10.

Below the cylinder is positioned the bottom plate 26 having a shoulder at 27 on which rests the lower end 28 of the cylinder or sleeve 25.

The central opening 29 of the bottom plate 26 will receive the lower journal extension 10.

The sandwich 13-15-16 which has been formed as indicated in FIGS. 2 and 3 is then inserted inside of the sleeve or cylinder 25.

The printing face 30 faces the inside of the cylinder 25.

Then by means of the pouring or feed element 31, the liquid epoxy resin is poured in in the direction 32 with the guide lip 33 to fill the space 34 between the outer face of the base 11 and the plastic sheet 13.

The compression cap 35 with the pressure faces 36 is then applied to force the epoxy resin 12 into the space 34, and the annular sleeve 37 is then applied to hold the combination together until the epoxy resin 12 will harden.

This compression head 35 has an opening 38 to receive the upper journal extension 10, and it will hold the cast fluid resin in position during the hardening operation, and will also force the sandwich 13-15-16 outwardly into the proper alignment and full concentricity.

After hardening, the bottom plate 26, the pressure plate 35 and the ring 37 may be removed to provide the flexographic printing cylinder as shown in FIG. 1.

It is thus apparent that the applicant has provided a novel combination which will automatically provide concentricity and surface evenness of rubber and other synthetic printing plates 16 mounted in cylinders 11 in flexographic printing.

The square ruled plastic, base sheet 13 will enable ready register and support of the plate 16 and will become an integral part of the final printing cylinder.

The secondary epoxy layer 12 will function both as a carrier and a leveling media for the plates.

This process will greatly simplify flexographic make ready methods and will provide concentricity and surface evenness.

As many changes could be made in the above flexographic printing, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner, the same is to be performed, what is claimed is:

1. A flexographic printing cylinder comprising a base steel roller, a plastic layer on said roller, a ruled plastic carrier on said plastic layer and an outside printing plate, said plastic carrier and plate being thin, flexible and stretchable and said plastic layer being less flexible and being closely and permanently adherent to the outside of the roller and the inside of the plastic carrier and being substantially thicker than the plate and carrier.

2. A flexographic printing cylinder comprising a base steel roller, a plastic layer on said roller, a ruled plastic carrier on said plastic layer and an outside printing plate, said outside printing plate being mounted on said carrier by an adhesive, said plastic carrier and plate being thin, flexible and stretchable and said plastic layer being less flexible and being closely and permanently adherent to the outside of the roller and the inside of the plastic carrier and being substantially thicker than the plate and carrier.

3. A combination forming cylinder and flexographic roller having a cylindrical sandwich formed of an outside thin flexible rubber printing plate adhesively attached to an inside square ruled thin nylon sheet, an encircling cylindrical form closely contacting the outside of the sandwich, end caps closing the ends of the form, a central base steel roller with end shafts, and a compressed hardened cured resin between said sandwich and base roller, said plate being expanded into concentricity against said cylindrical form.

4. A flexographic printing cylinder comprising a base steel roller, a pressure inserted plastic layer on said roller, a ruled plastic carrier on said plastic layer and an outside rubber printing plate, said plastic layer being concentric with and carried on said base steel roller, said plastic carrier and plate being thin, flexible and stretchable and said plastic layer being less flexible and being closely and permanently adherent to the outside of the roller and the inside of the plastic carrier and being substantially thicker than the plate and carrier.

References Cited by the Examiner

UNITED STATES PATENTS

| | | | |
|---|---|---|---|
| 274,728 | 3/1883 | Crutsinger | 18—29 |
| 753,959 | 3/1904 | Crump. | |
| 794,492 | 7/1905 | Crump | 18—29 |
| 1,319,107 | 10/1919 | Novotny. | |
| 1,607,267 | 11/1926 | Lublintz et al. | 101—426 |
| 2,047,624 | 7/1936 | Freedlander | 101—395 X |
| 2,048,631 | 7/1936 | Motson | 101—379 X |
| 2,536,316 | 1/1951 | Schwartz et al. | |
| 3,029,730 | 4/1962 | Parrish et al. | 101—395 X |

OTHER REFERENCES

H. Lee and K. Neville: Epoxy Resins, McGraw-Hill, New York, 1957, pages 195, 199.

ROBERT E. PULFREY, *Primary Examiner.*

EUGENE R. CAPOZIO, *Examiner.*

H. P. EWELL, *Assistant Examiner.*